No. 696,102. Patented Mar. 25, 1902.
F. L. KOEHLER.
SPRING BEARING FOR BICYCLES OR OTHER VEHICLES.
(Application filed Feb. 6, 1902.)
(No Model.) 5 Sheets—Sheet 1.
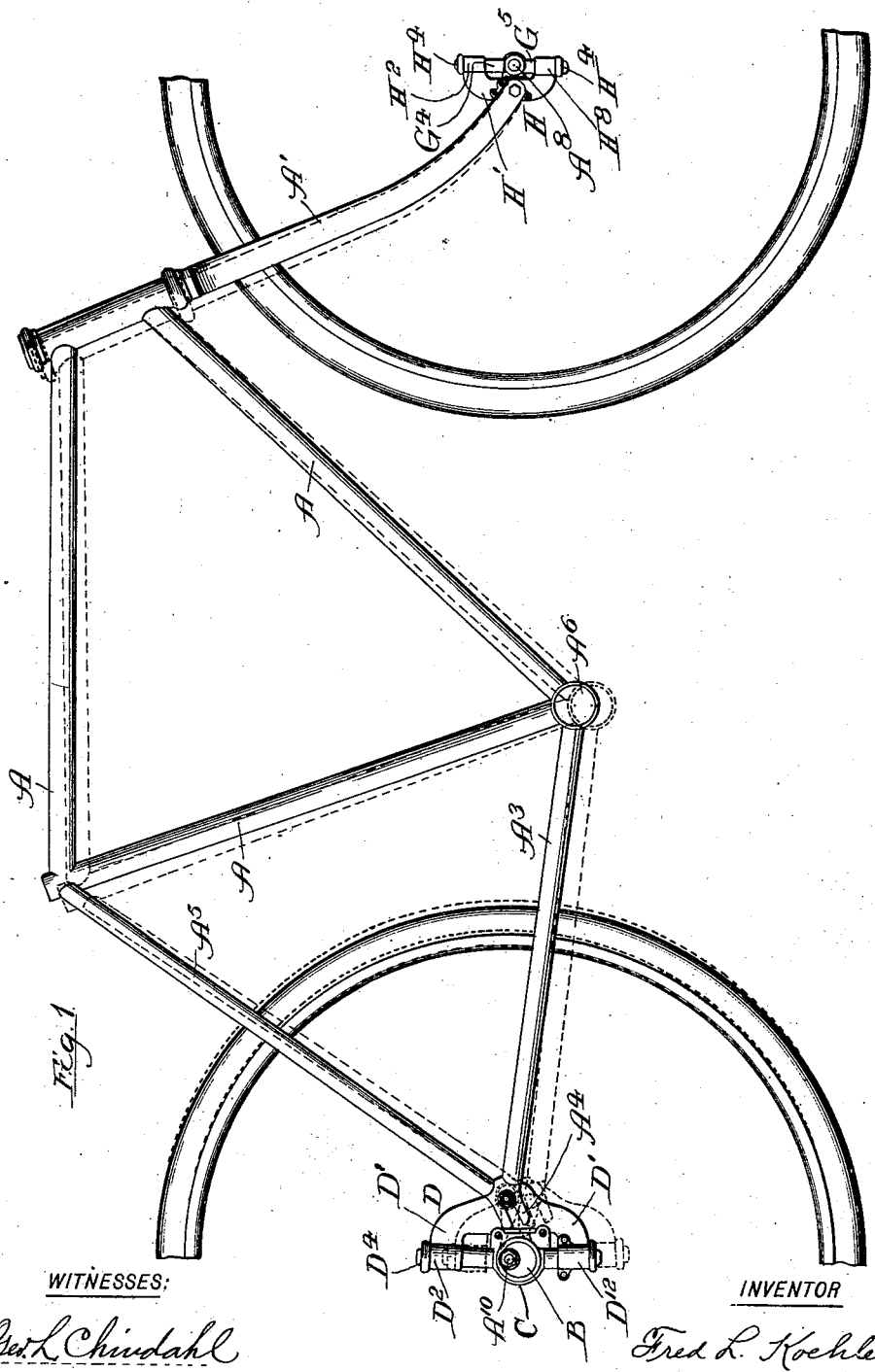
WITNESSES: INVENTOR
Fred L. Koehler
By Luther L. Miller
ATTORNEY.

No. 696,102.  
F. L. KOEHLER.  
SPRING BEARING FOR BICYCLES OR OTHER VEHICLES.  
(Application filed Feb. 6, 1902.)  
Patented Mar. 25, 1902.
(No Model.)  
5 Sheets—Sheet 2.
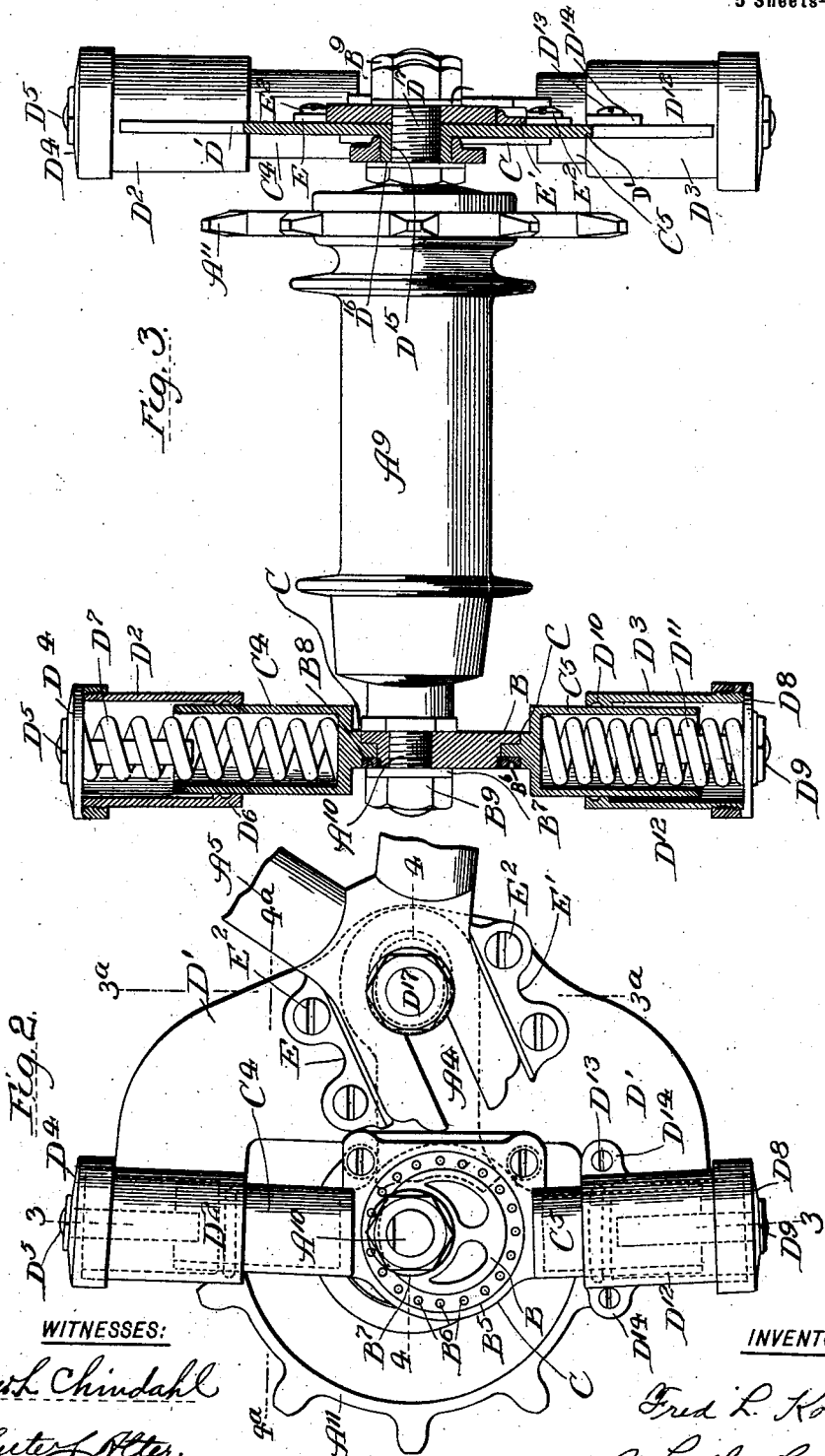
WITNESSES:
INVENTOR  
Fred L. Koehler  
By Luther L. Miller  
ATTORNEY.

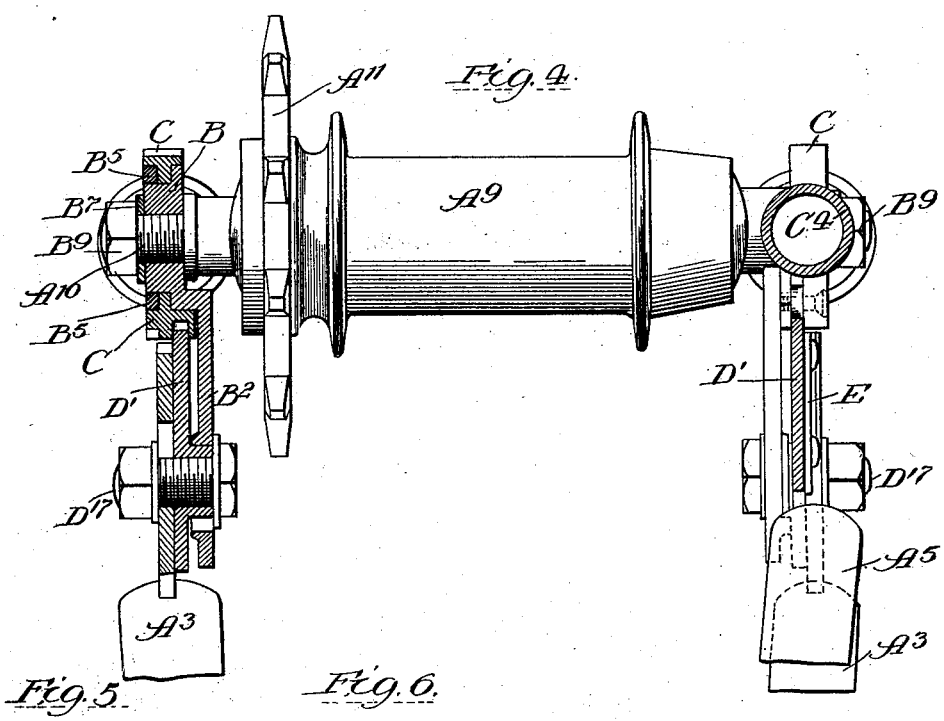
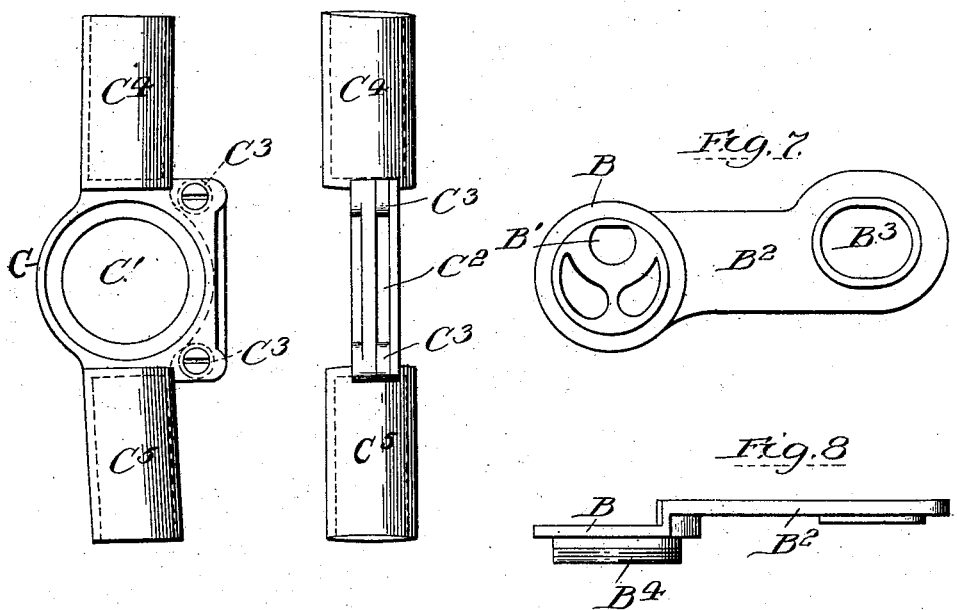

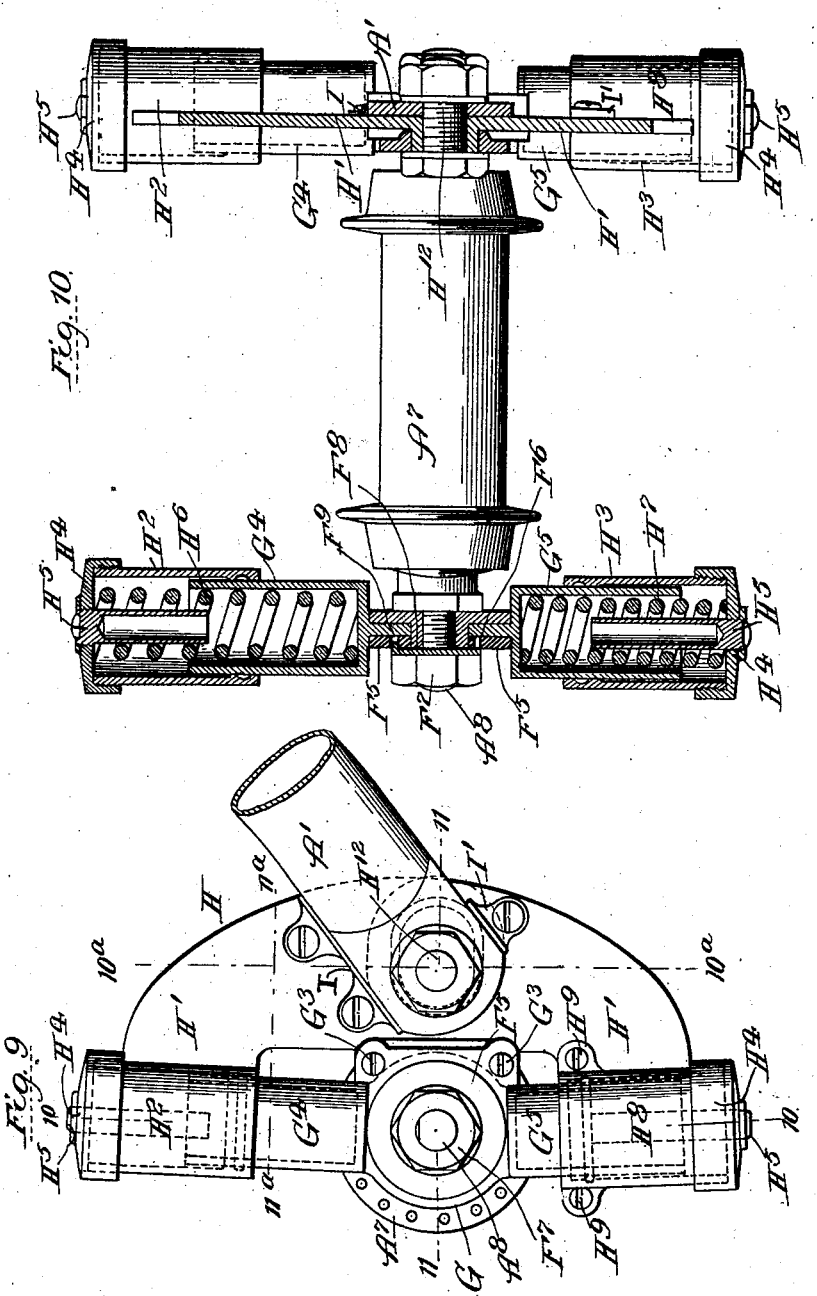

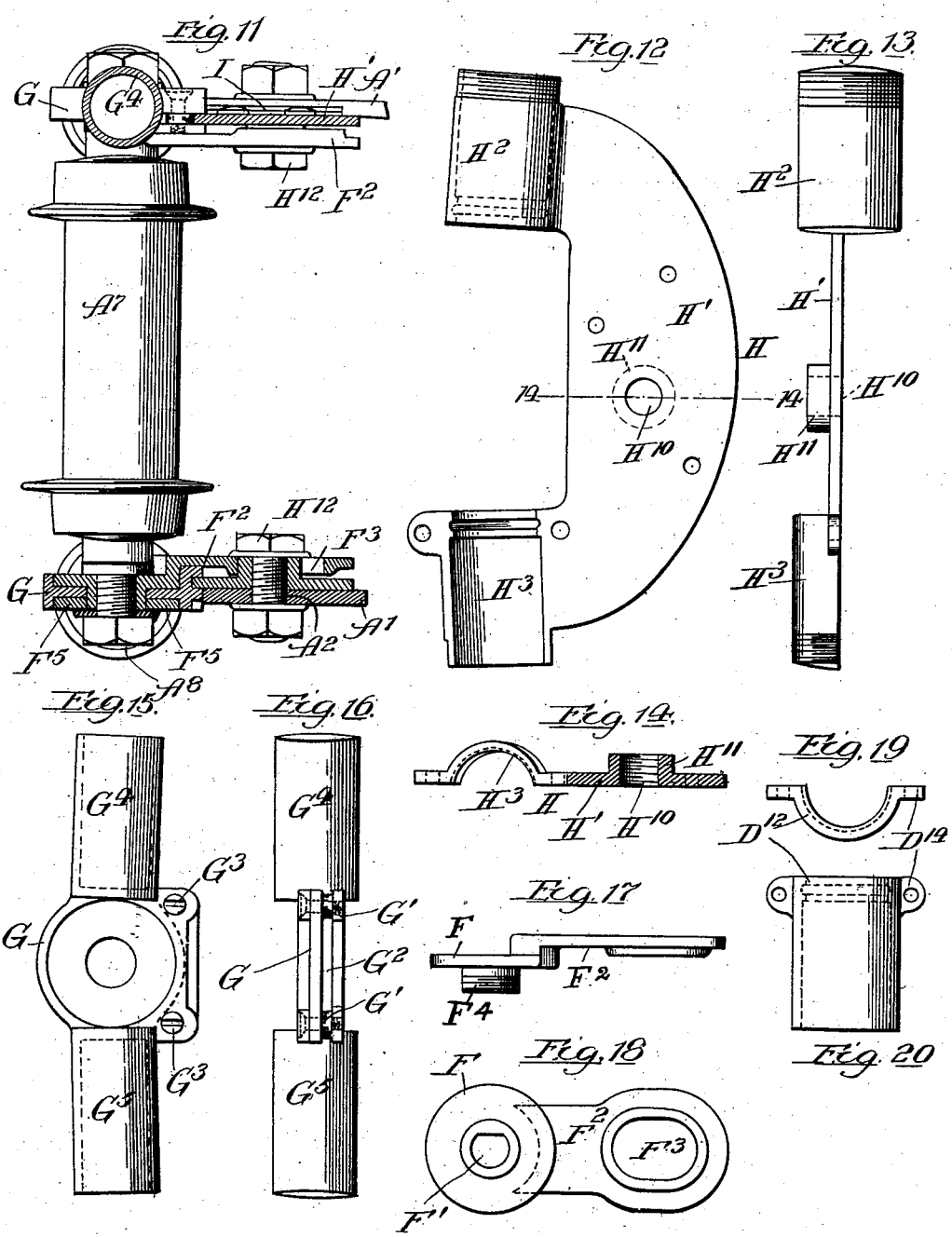

UNITED STATES PATENT OFFICE.

FRED L. KOEHLER, OF CHICAGO, ILLINOIS, ASSIGNOR OF ONE-THIRD TO THOMAS J. DUNNE, OF MARION, SOUTH DAKOTA.

SPRING-BEARING FOR BICYCLES OR OTHER VEHICLES.

SPECIFICATION forming part of Letters Patent No. 696,102, dated March 25, 1902.

Application filed February 6, 1902. Serial No. 92,899. (No model.)

*To all whom it may concern:*

Be it known that I, FRED L. KOEHLER, a citizen of the United States, residing at Chicago, in the county of Cook and State of Illinois, have invented certain new and useful Improvements in Bicycles or other Vehicles, of which the following is a specification.

This invention relates to spring-bearings for safety-bicycles and other similar vehicles, and has for its object the production of a vehicle wherein the weight of the rider is borne on springs, so that the shocks and jars received by the wheels in passing over the inequalities of the road are not imparted to the rider's seat and wherein the plane of the axles is always maintained at right angles to the longitudinal vertical plane of the supporting-frame of the vehicle. This idea, broadly—to wit, that of providing the frame of a safety-bicycle or similar vehicle with springs—I am aware is not new; but I believe such a vehicle has never been produced wherein a compensating device maintains the drive-chain at a certain uniform tension and at the same time prevents the tilting of the wheel-axles and the consequent wabbling of the wheel with relation to the supporting-frame.

The improvements herein shown and described are intended to be applied to wheels already in use, as well as by manufacturers to those being newly built. The springs mentioned may be applied to both front and rear forks of a bicycle or to the rear forks alone.

One of the principal difficulties in providing spring-bearings for a bicycle of the common form is that the distance between the crank-shaft and the rear axle varies with the yielding movement of the spring, making the drive-chain sometimes too tight and sometimes too loose. Others have sought to remedy this difficulty by mounting the axle of the rear wheel in guides formed on the arc of a circle whose center is in the crank-shaft; but this arrangement does not give a free vertical movement of the rear end of the bicycle-frame. It also, in common with almost all spring-bearings, permits one end of the axle to tilt downward, causing the wheel to wabble within its supporting-forks.

In the embodiment herein shown of this invention I provide two helical compression-springs for each fork end, which springs are interposed between the end of the axle and the fork, one to be secured above the axle to carry the weight of the rider, the other to be placed below the axle to cushion the downward movement of the wheels. The compensating device for maintaining an even tension of the chain comprises an eccentric upon which the rear axle is mounted. This eccentric has a crank-arm fixed with relation thereto, which crank-arm has a pivotal connection at a fixed point with the supporting-frame. An upward or downward movement of the frame thus moves the crank-arm and oscillates the eccentric, and this movement of the eccentric moves the rear axle to or from the crank-shaft a sufficient distance to maintain an even tension on the drive-chain. The crank-arm for the eccentric near each end of the rear axle is pivotally mounted with relation to one of the rear forks, from which it will be seen that both ends of the axle move upward and downward together.

Other improvements will be more fully described hereinafter.

In the accompanying drawings, Figure 1 is a side elevation of a bicycle-frame embodying the features of my invention, showing in dotted lines the position of the supporting-frame after a downward movement of its rear end and the consequent movement of the compensating mechanism. In this figure the size of the spring-bearing attachments is increased in undue proportion. I have shown them thus for the sake of greater clearness. Fig. 2 is a side elevation of my attachment in its application to the rear axle of a bicycle. Fig. 3 is a view of the hub of the rear wheel of a bicycle, showing the spring-bearing attachment, the latter on the left-hand side of Fig. 3 being a transverse vertical section on dotted line 3 3 of Fig. 2, while on the right-hand side Fig. 3 shows the spring-bearing in elevation, illustrating the inclosing telescoping spring-casings and showing the mechanism in the foreground on dotted line 3ª 3ª of Fig. 2. Fig. 4 is a view looking downward upon the hub of the rear wheel. At the left this figure is on dotted line 4 4 of Fig. 2, while on the right it is on dotted line 4ª 4ª of Fig. 2. Fig. 5 is a side elevation of the eccentric-holding bracket and its integral oppositely-extending spring-casings. Fig. 6 is a front elevation of the part shown in the preceding figure. Fig. 7 is a side elevation of the eccentric and its integral crank. Fig. 8 is an edge view of the part shown in the preceding figure. Fig. 9 is a side elevation of the bracket for the attachment of the spring mechanism to the front axle. Fig. 10 is a side elevation of the front hub of the bicycle, showing the spring-casings at the left of said Fig. 10 in transverse vertical section on dotted line 10 10 of Fig. 9, and on the right of said Fig. 10 showing the bracket in section on dotted line $10^a$ $10^a$ of Fig. 9, the spring-casings being in elevation. Fig. 11 is a plan view of the forward hub of a bicycle embodying my improvements, the lower end of the spring attachment, as shown in this figure, being represented in section on dotted line 11 11 of Fig. 9, the upper end being in section on dotted line $11^a$ $11^a$ of Fig. 9. Fig. 12 is a side elevation of the spring-holding bracket intended to be secured to the lower end of each one of the front forks. Fig. 13 is an edge view of the bracket shown in the preceding figure. Fig. 14 is a transverse section through said spring-holding bracket on dotted line 14 14 of Fig. 12. Fig. 15 is a side view of the front-axle bracket with its integral tubular spring-casings. Fig. 16 is a rear side elevation of the bracket shown in the preceding figure. Fig. 17 is an edge view of the cylindric stud adapted to be secured to each end of the front axle and its integral crank-arm. Fig. 18 is a side view of said stud and crank-arm. Fig. 19 is a top plan view of the semitubular portion of the spring-casing $D^3$. Fig. 20 is a side view of said semitubular portion as shown in the preceding figure.

Like letters of reference indicate corresponding parts throughout the several views.

As before stated, my improvements as herein embodied are applicable to safety-bicycles, and in the accompanying drawings A is the frame, A' the front forks, $A^2$ the openings in the lower ends of said forks, $A^3$ the rear forks, $A^4$ the elongated chain-adjusting slot in the rear ends of said forks $A^3$, $A^5$ the rear braces, $A^6$ the crank-hanger, $A^7$ the front-wheel hub, $A^8$ the front-wheel axle, flattened on one side at its ends, $A^9$ the rear-wheel hub, $A^{10}$ the rear-wheel axle, also flattened on one side at its ends, and $A^{11}$ the rear driving-sprocket, all common to the ordinary safety-bicycle.

B represents two eccentrics rigidly mounted on the rear axle $A^{10}$, at opposite ends thereof, outside of the hub $A^9$, the opening B', extending through said eccentric, having a flattened portion on one side to correspond with the flattened portion on said axle to prevent the axle from turning with relation to the eccentric B. Each of the two eccentrics B has an offset crank-arm $B^2$ extending therefrom, and at its outer end this arm is provided with an elongated opening $B^3$. Each of the eccentrics B has the peripheral screw-threads $B^4$ for the reception of a correspondingly-threaded annulus $B^5$. This annulus is provided in its face with depressions $B^6$ for the purpose of locking the adjustment of said annulus with relation to the eccentric B. A washer $B^7$, having a flattened side in its central opening to fit upon the rear-wheel axle $A^{10}$ without turning thereon, is also provided with a downwardly-projecting lip $B^8$ to enter one of the depressions $B^6$ in the face of the annulus $B^5$, and when the usual nut $B^9$ on the outer end of said rear axle is tightened against said washer the annulus is prevented from turning and the adjustment of the annulus is maintained. It will thus be seen that the eccentrics B and their integral crank-arms $B^2$ are fixed with relation to the rear-wheel axle $A^{10}$, and therefore that said axle will be depressed at both ends alike, and therefore the wheel will not tip or wabble in the frame.

C is a bracket located at each end of the axle $A^{10}$, provided with a central opening C' for the reception of the eccentric B. At its forward edge this bracket has the vertical groove $C^2$, and in said groove is provided with the bearing-rollers $C^3$, the purpose of which rollers will be later mentioned herein. The upper end of the bracket C has the tubular spring-casing $C^4$ and at its lower side a similar casing $C^5$. The casing $C^5$ is not in direct alinement with the casing $C^4$, the former being inclined slightly forward from the axial line of said casing $C^4$.

D is a vertical yoke for each bracket C, having the central web portion D', the rear edge of which web is adapted to lie within the vertical groove $C^2$ of the bracket C and slide upward and downward therein, bearing upon the rollers $C^3$. The yoke also has the oppositely-extending tubular caps $D^2$ and $D^3$ for surrounding and telescoping the tubular casings $C^4$ and $C^5$, respectively. The cap $D^2$ is formed integral with the yoke D, excepting at its outer end, where it is provided with the screw-threaded closure $D^4$. A central pin $D^5$ is secured within the cap $D^2$, and the lower portion of said cap is provided with an annular groove $D^6$ for retaining oil to make a dust-tight joint between the telescoping casing $C^4$ and cap $D^2$ and to keep the contacting surfaces lubricated. A helical compression-spring $D^7$ surrounds the pin $D^5$ and lies within the telescoping casing $C^4$ and cap $D^2$. The cap $D^3$ is similar to the cap $D^2$, just described. It is provided with a screw-threaded closure $D^8$, has the central pin $D^9$, and the annular oil-retaining groove $D^{10}$.

$D^{11}$ is a helical spring within the telescoping casing $C^5$ and the cap $D^3$. The cap $D^3$ is formed one half integral with the web D'. The other and corresponding half $D^{12}$, semitubular in shape, is formed separately and secured to the yoke D by the screws $D^{13}$ passing through perforated ears $D^{14}$ on said semitubular portion $D^{12}$. The yoke D near the middle of its web portion D' is provided with the transverse opening $D^{15}$, and this opening on the inner face of the web $D'$ is surrounded by the annular bearing-stud $D^{16}$, formed integral with the web portion $D'$. The elongated opening $B^3$ in the offset crank-arm $B^2$ of the eccentric B is adapted to receive the bearing-stud $D^{16}$, the bolt $D^{17}$ holding said arm in place on said stud.

E and $E'$ are two clips intended to be fastened to the outer face of the web portion $D'$ of each of the yokes D to bear against the upper and the lower sides of the rear forks $A^3$ of the bicycle-frame and hold said yokes in a position fixed with relation to that of said forks. These clips are secured to the outer faces of the web portions $D'$ by means of the screws $E^2$, and said rear forks are clamped firmly in contact with said webs between the clips E and $E'$ by the bolts $D^{17}$ passing through the elongated slots $A^4$ of said forks $A^3$.

In fitting the attachment herein described to a bicycle the rear forks are bolted to the yokes D and the position of the clips E and $E'$ determined. Holes are then drilled at proper points through the web $D'$ of the yokes D, adapted to receive the screws $E^2$. The clips are then placed in position and the forks held firmly between them by tightening the bolts $D^{17}$, care being taken that the edge of the web $D'$ of the yoke D bears firmly against the rollers $C^3$ in the groove $C^2$.

I have now described my spring attachment in its adaptation to the rear wheel of a bicycle. In its application to the forward wheel the parts are similar throughout, except that since the necessity for compensating for the lengthening and shortening of the chain is obviated the eccentric B of the rear wheel becomes a cylindric centrally-perforated stud in the forward wheel, the crank-arms to rotate said stud, however, being preserved in order that both ends of the axle shall rise and fall evenly and that the wheel shall thereby be retained centrally between the forward forks $A'$.

F is a cylindric stud centrally perforated by the opening $F'$ to receive the forward axle $A^8$. The opening $F'$ has a flattened side to prevent the turning of said axle therein, the axle being flattened correspondingly. The cylindric stud F, like the eccentric B, has an offset crank-arm $F^2$, is provided with the elongated opening $F^3$ in said crank-arm, and has the screw-threaded portion $F^4$, corresponding to the like part $B^4$ of said eccentric B. A threaded annulus $F^5$ is likewise provided for the screw-threads $F^4$ on the cylindric stud F, and this annulus has the perforations $F^6$.

$F^7$ is the usual nut at the outer ends of the front-wheel axle $A^8$, and $F^8$ a washer having a flattened side to correspond with the similar flattened side of said axle, is provided with a downwardly-extending lip $F^9$, intended to enter one of the series of perforations in the face of the annulus $F^5$. It will thus be seen that when the annulus $F^5$ is turned to its proper adjustment on the screw-threads $F^4$ of the cylindric stud F said annulus may be retained in its proper adjustment by placing the lip $F^9$ of the washer $F^8$ in one of the openings $F^6$ in the face of the annulus and turning the nut $F^7$ tightly against said washer.

G is a bracket centrally perforated for the reception of the cylindric stud F. This bracket is provided with bearing-rollers $G'$ in the groove $G^2$ in its edge. These rollers are mounted upon the screws $G^3$, passing through suitable openings in the bracket G. The purpose of the groove $G^2$ in the bracket G, as well as that of the groove $C^2$ in the bracket C, is to prevent sidewise movement of the yokes H and D, respectively. The edges of the webs of the yokes lie in said grooves and bearing upon the rollers $G'$ and $C'$ are free to slide vertically in the grooves. The rollers $C'$ also prevent the pulling of the driving-chain from causing undue strain upon the eccentric B as the bracket C moves upward and downward upon the springs $D^7$ and $D^{11}$, giving the yoke a long bearing upon the bracket and promoting a free sliding movement between the bracket and the yoke.

$G^4$ and $G^5$ are oppositely-extending tubular spring-casings corresponding in shape and position to the similar casings of the bracket C.

H is a yoke located at either end of the axle $A^8$, corresponding to the yoke D. It has the central web portion $H'$, the tubular caps $H^2$ and $H^3$, adapted to telescope with the casings $G^4$ and $G^5$, respectively, of the bracket G. It also has the screw-threaded closures $H^4$ and the inwardly-extending central pins $H^5$ for holding the helical springs $H^6$ and $H^7$ in proper place within the telescoping casing $G^4$ and cap $H^2$ and the casing $G^5$ and cap $H^3$, respectively. The cap $H^3$ comprises the semitubular portion $H^8$, held in position upon the yoke H by the screws $H^9$. The web $H'$ is provided with an opening $H^{10}$, surrounded by the annular bearing-stud $H^{11}$, and through said opening the bolt $H^{12}$ is adapted to extend. The annular bearing-stud is intended to lie within the elongated opening $F^3$ of the offset crank-arm $F^2$ of the cylindric bearing-stud F.

I and $I'$ are clips secured to the outer side of the web $H'$ of the yoke H and are intended to hold the front forks $A'$ rigid with relation to said yokes H, the bolts $H^{12}$ passing through the usual perforations $A^2$ in the lower end of said forks, holding the forks rigid relative to said yokes.

To fit a safety-bicycle of the usual form with the attachments hereinbefore described, the wheels should first be removed from the frame and an eccentric B placed upon each of the outer ends of the rear axle $A^{10}$, and a cylindric stud F upon each of the outer ends of the front axle. Brackets C are placed on the rear axle outside of said eccentrics and the yokes D put in position, the caps $D^2$ and $D^3$ fitting over the tubular spring-casings $C^4$ and $C^5$, respectively, the springs $D^7$ and $D^{11}$ being in the casings $C^4$ and $C^5$. The bolts $D^{17}$ are then passed through the annular bearing-stud $D^{16}$ and through the opening $D^{15}$ in the web $D'$ of the yoke $D$; also, through the usual slotted opening $A^4$ at the rear end of each of the rear forks $A^3$ of the bicycle-frame $A$. The proper relative position of the bracket $D$ is obtained and the clips $E$ and $E'$ are fastened to the outer faces of the web portions $D'$ of the yoke $D$, holding the fork end rigid with said yoke. The forward spring-bearing is put in place in the same manner, the bolts $H^{12}$ passing through the opening $H^{10}$ and through the perforations at the lower end of the forward forks. The clips $I$ and $I'$ are secured in position and the bolts $H^{12}$ tightened upon the forks $A'$. The weight of the rider resting upon the saddle of the bicycle presses downward upon the helical compression-springs $D^7$ and $H^6$ at the rear and forward bearings of the bicycle, respectively. Upward jolts of the wheels are absorbed by these springs. Downward movements of the wheels or upward movements of the frame are cushioned against the lower springs $D^{11}$ and $H^7$ for the rear and front axles, respectively. Upward and downward movements of the rear forks oscillate the eccentrics $B$ by means of their crank-arms $B^2$, throwing the rear axle $A^{10}$ away from and toward the crank-hanger $A^6$, serving automatically to hold the chain at a uniform tension.

I claim as my invention—

1. In a spring-bearing for bicycles and other vehicles, in combination, a supporting-frame; a wheel; an axle therefor; and means comprising a pivoted member, for connecting the wheel-axle to the frame, and for maintaining said axle at a constant distance from the driving-axle of the bicycle.

2. In a spring-bearing for bicycles and other vehicles, in combination, a supporting-frame; a wheel; an axle therefor; and means comprising a member having a pivotal engagement with the supporting-frame and a rigid connection with the wheel-axle, for maintaining said axle at a constant distance from the driving-axle of the bicycle.

3. In a spring-bearing for bicycles and other vehicles, in combination, a supporting-frame; a wheel; an axle therefor; and means comprising an eccentric pivotally mounted on the frame, for supporting the wheel-axle, and maintaining it at a constant distance from the driving-axle of the bicycle.

4. In a spring-bearing for bicycles and other vehicles, in combination, a supporting-frame; an eccentric having a yielding connection with said frame; an axle mounted on said eccentric; and an arm fixed with relation to the eccentric and adapted to rotate the same, said arm having a pivotal engagement with the supporting-frame.

5. In a spring-bearing for bicycles and other vehicles, in combination, a supporting-frame; a bracket having a yielding connection with said frame; an eccentric rotatably mounted in said bracket; an axle mounted on said eccentric; and an arm fixed with relation to the eccentric and adapted to rotate the same, said arm having a pivotal engagement with said supporting-frame.

6. In a spring-bearing for bicycles and other vehicles, in combination, a supporting-frame; a bracket having a sliding connection with the supporting-frame; a spring interposed between the bracket and the frame; an eccentric rotatably mounted in said bracket; an axle mounted on said eccentric; an arm fixed with relation to the eccentric, said arm having an elongated opening therein; and a stud fixed with relation to said frame, adapted to enter the elongated opening in said arm, to move said arm and rotate said eccentric, and thereby move said axle to retain it in the arc of a circle having its center in the driving-axle of the bicycle.

7. In a spring-bearing for bicycles and other vehicles, in combination, a supporting-frame; a bracket having a spring-casing; a spring for said casing, said supporting-frame resting upon said spring; an eccentric rotatably mounted in said bracket; an axle mounted on said eccentric; an arm formed integral with said eccentric, said arm having an elongated opening therein; and a stud fixed with relation to said frame, adapted to lie within the elongated opening in said arm, to rotate said eccentric, and to move said axle to retain it in the arc of a circle having its center in the driving-axle of the bicycle.

8. In a spring-bearing for bicycles and other vehicles, in combination, a supporting-frame; two brackets having oppositely-extending tubular spring-casings; two yokes for the supporting-frame, each yoke having a cap for inclosing each of said spring-casings; a spring for each of the casings; each of said brackets having a vertical guide-groove for its yoke; bearing-rollers in said grooves; an eccentric rotatably mounted in each of said brackets; an axle extending through both of said eccentrics; and an arm for each eccentric, having a pivotal engagement with the supporting-frame.

FRED L. KOEHLER.

Witnesses:
GEO. L. CHINDAHL,
ERNEST WEHLAU.